(12) United States Patent
Chen

(10) Patent No.: US 8,738,941 B2
(45) Date of Patent: May 27, 2014

(54) COMPUTER INTEGRAL DEVICE SYSTEM AND METHOD FOR INTEGRATING A TABLET PERSONAL COMPUTER AND A COMPUTER HOST

(75) Inventor: Shih-Jui Chen, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 289 days.

(21) Appl. No.: 13/305,445

(22) Filed: Nov. 28, 2011

(65) Prior Publication Data

US 2012/0303978 A1 Nov. 29, 2012

Related U.S. Application Data

(60) Provisional application No. 61/489,746, filed on May 25, 2011.

(51) Int. Cl.
*G06F 1/00* (2006.01)
*G06F 13/00* (2006.01)

(52) U.S. Cl.
USPC ............................ 713/300; 710/303; 710/304

(58) Field of Classification Search
USPC ...................................................... 713/300
See application file for complete search history.

(56) References Cited

U.S. PATENT DOCUMENTS

| | | | |
|---|---|---|---|
| 7,565,472 B2 * | 7/2009 | Cheah et al. | 710/300 |
| 7,668,974 B2 * | 2/2010 | Ragnunath et al. | 710/8 |
| 7,680,643 B2 * | 3/2010 | Ragnunath et al. | 703/20 |
| 8,060,735 B2 * | 11/2011 | Madjlessi | 713/1 |
| 8,260,998 B2 * | 9/2012 | Ganesh et al. | 710/303 |
| 2006/0061951 A1 * | 3/2006 | Hara | 361/683 |
| 2010/0090644 A1 * | 4/2010 | Nokkonen et al. | 320/107 |
| 2010/0251106 A1 * | 9/2010 | Barrus et al. | 715/268 |

FOREIGN PATENT DOCUMENTS

CN 2491899 5/2002

OTHER PUBLICATIONS

English language translation of abstract of CN 2491899 (published May 15, 2002).

* cited by examiner

*Primary Examiner* — Suresh Suryawanshi
(74) *Attorney, Agent, or Firm* — McClure, Qualey & Rodack, LLP

(57) ABSTRACT

A computer integral device includes a detection unit for detecting whether an external electronic device is in a determined position, wherein the external electronic device has been turned on; and a computer host, coupled to the detection unit. When the external electronic device is detected to be in the determined position, a power enable signal is sent to the computer host so as to activate the computer host to execute a computer turn on process. After the computer turn on process is executed by the computer host, the external electronic device may display image data received via a wireless communication link established between the computer host and the external electronic device.

23 Claims, 4 Drawing Sheets

COMPUTER INTEGRAL DEVICE SYSTEM AND METHOD FOR INTEGRATING A TABLET PERSONAL COMPUTER AND A COMPUTER HOST

CROSS REFERENCE TO RELATED APPLICATIONS

This application claims the benefit of U.S. Provisional Application No. 61/489,746, filed on May 27, 2011, the contents of which are incorporated herein by reference.

BACKGROUND OF THE INVENTION

1. Field of the Invention

The disclosure relates generally to a computer integral device, and more particularly relates to devices, systems and methods for integrating a tablet personal computer and a computer host.

2. Description of the Related Art

Conventional computer host is turned on or off a by a power button. When the power button is pressed by a user, two corresponding power control pins of the computer host will be short-circuited. When the power button is released, the power control pins of the computer host will be open-circuited. Accordingly, an impulse signal is generated due to two different statuses of the two power control pins, wherein turning on/off of the computer is controlled via the impulse signal. Nowadays, turning on/off of the computer is limited to using a power button, which is inconvenient when a user wants to integrate a tablet personal computer with a computer host.

Smart phones and the tablet personal computers are more and more widely used in people's daily lives. However, portable electronic devices such as smart phones or tablet personal computers normally embed low-performance processors such that users may still need a desktop computer to perform complex operations. Thus, there is a need to propose a convenient way of integrating a tablet personal computer and a computer host so as to decrease users' loading in operating many computer systems.

BRIEF SUMMARY OF THE INVENTION

An embodiment of a computer integral device comprises a detection unit for detecting whether an external electronic device is in a determined position, wherein the external electronic device has been turned on; and a computer host, coupled to the detection unit. When the external electronic device is detected to be in the determined position by the detection unit, the detection unit sends a power enable signal to the computer host and then the computer host executes a computer turn on process according to the power enable signal. After the computer turn on process is executed by the computer host, the external electronic device displays image data received via a wireless communication link from the computer host.

An embodiment of a computer integral system, comprises: an external electronic device, comprising: an external communication unit for receiving an image signal; and a display unit for displaying image data according to the image signal, wherein the external electronic device has been turned on; and a computer integral device, comprising: a detection unit for detecting whether the external electronic device is in a determined position; and a computer host, coupled to the detection unit, and having the image data and a computer communication unit, wherein when the external electronic device is detected to be in the determined position by the detection unit, the detection unit sends a power enable signal to the computer host and the computer host executes a computer turn on process according to the power enable signal, wherein after the computer turn on process is executed by the computer host and a wireless communication link has been established between the computer host and the external electronic device, the computer communication unit generates and transmits image signals to the external communication unit via the wireless communication link.

An embodiment of a computer integral method for a tablet PC, comprises: executing a computer turn on process on a computer host when a tablet PC contacts with the computer host, wherein the tablet PC has been turned on; after the computer turn on process is executed, receiving a turn on notification signal broadcasted from the computer host indicative of available of establishing a wireless communication link with the tablet; displaying image data transmitted by the computer host on the tablet PC after a wireless communication link has been established.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1A:
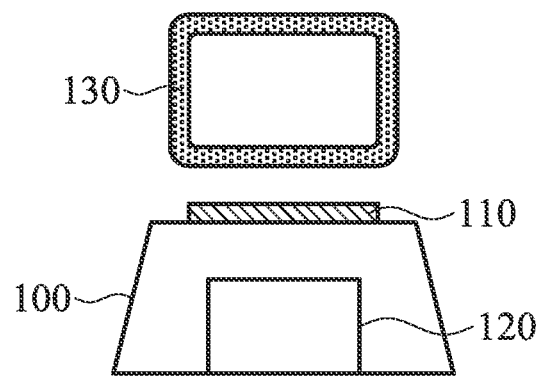
FIG. 1A is a schematic diagram illustrating an embodiment of a computer integral device 100 when an external electronic device 130 is not placed thereon.
Figure 1B:
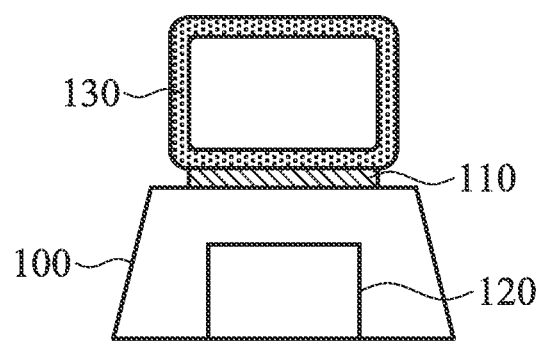
FIG. 1B is a schematic diagram illustrating an embodiment of a computer integral device 100 when an external electronic device 130 is placed thereon.
Figure 1C:
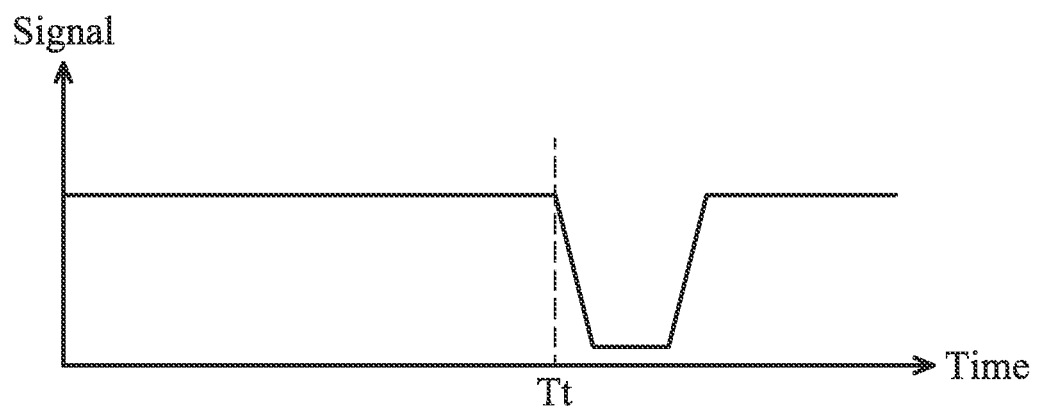
FIG. 1C is a clock pulse diagram illustrating an embodiment of a computer integral device 100 when an external electronic device 130 is placed thereon/not placed thereon.

FIG. 1A is a schematic diagram illustrating an embodiment of a computer integral device 100 when an external electronic device 130 is not placed thereon, while FIG. 1B shows a diagram has been placed onto the external electronic device 130. The computer integral device 100 of the present embodiment turns on/off a computer host by detecting the existence of the external electronic device 130 via a detection unit 110. This is different from the conventional computer device being turned on/off by a power button. When the detection unit 110 detects that the external electronic device 130 is in the determined position, the detection unit 110 makes two power control pins of the computer host 120 short-circuited. When the detection unit 110 does not detect that the external electronic device 130 is in the determined position, the detection unit 110 makes two power control pins of the computer host 120 open-circuited. Accordingly, an impulse signal is generated due to these two statuses of the two power control pins. FIG. 1C illustrates the impulse signal at time Tt, which controls the computer turn on/off process of the computer host 120. At the time just after the computer turn on process is executed, the wireless communication link between the external electronic device 130 and the computer host 120 has not been established, and the computer host 120 does not recognize which external electronic device triggered this computer turn on process. Thus, the computer host 120 broadcasts a turn on notice signal to the external electronic device 130 via wireless communication so as to inform the external electronic device 130 of the computer host 120 is available for establishment of a wireless communication link. As a result, when the computer host 120 broadcasts a turn on notice signal, the external electronic device 130 may receive this turn on notice signal from the computer host 120 by the wireless communication. The external electronic device 130 may obtain associated information of the computer host 120 by means of the turn on notice signal, and further display a message that the computer host 120 is available for establishment of a wireless communication link on the screen (not shown) of the external electronic device 130. Thus, a user may select the computer host 120 from the external electronic device 130, and then notify the computer host 120 for establishment of a wireless communication link therewith. In the illustrated embodiment, after the wireless communication link between the external electronic device 130 and the computer host 120 is established, the external electronic device 130 may operate as a monitor of the computer host 120. The user may input instructions via a keyboard or mouse of the computer host 120, and associated responses of the instructions may be displayed on the screen of the external electronic device 130 by the wireless communication link. Therefore, a user may use the computer host 120 to operate complex operations, when the external electronic device 130 works as a monitor of the computer host 120. It should be noted, that the user may also input instructions via the external electronic device 130, and those who are skilled in this technology may add this function without departing from the scope and spirit of this invention.

Although the impulse signal is performed by a high voltage level being switched to a low voltage level for example, it may also be performed by a low voltage level being switched to a high voltage level.

Figure 1D:
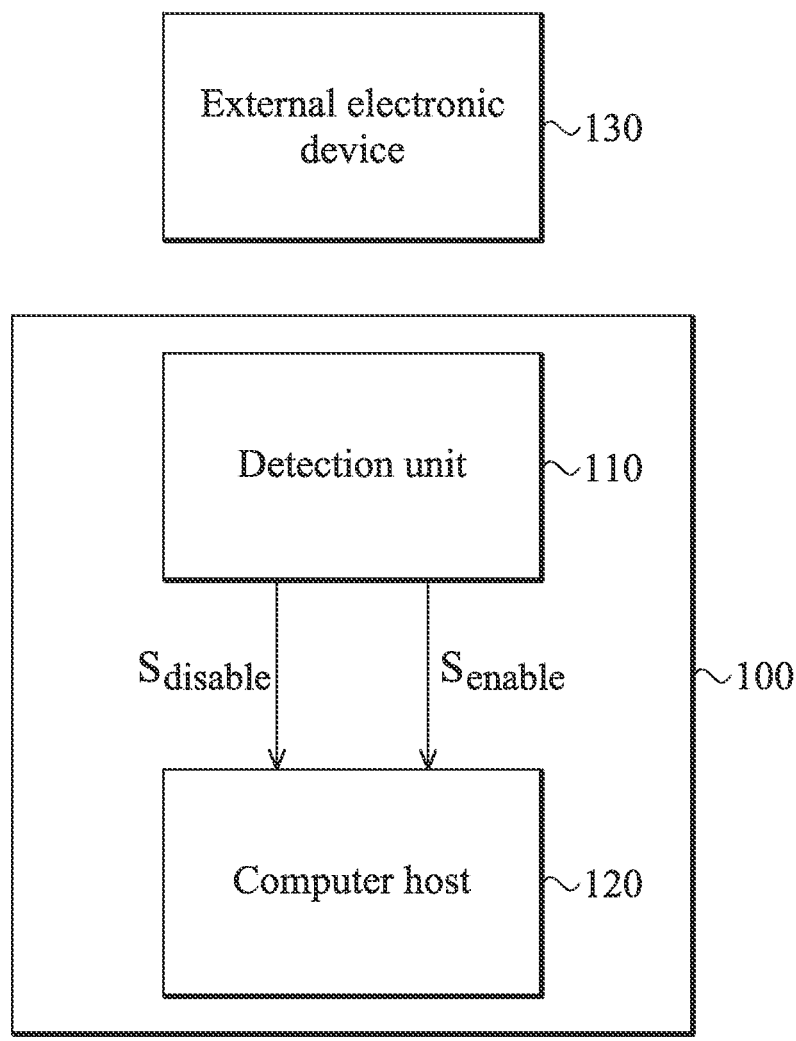
FIG. 1D is a block diagram illustrating an embodiment of a computer integral device 100.

FIG. 1D is a block diagram illustrating an embodiment of a computer integral device 100. The computer integral device 100 comprises a detection unit 110 and a computer host 120. The computer host 120 is coupled to the detection unit 110. In order to connect the computer host 120 and the external electronic device 130 together more conveniently, the detection unit 110 determines whether to turn on the computer host 120 by detecting whether the external electronic device 130 is in a determined position. For example, if the detection unit 110 is an infrared ray detection unit, it may set an infrared ray sensor in the determined position (such as in a foundation or any base capable of holding the external electronic device). Thus, when the external electronic device 130 is moved in or out of the determined position, the infrared ray sensor may transmit a signal to the computer host to notify the computer host and further activate the computer turn on/off process accordingly. In another illustrated embodiment, the detection unit 110 may be also performed by a pressure detection unit to detect whether the external electronic device 130 is moved into the determined position and whether the external electronic device 130 is moved out of the determined position, and further transmit a signal to the computer host to notify the computer host and further activate the computer turn on/off process accordingly. For example, the detection unit 110 may generate a power enable signal $S_{enable}$ or a power disable signal $S_{disable}$ to control the turn on/off of the computer host 120 according to the detection of whether the external electronic device 130 has placed in the determined position.

In the illustrated embodiment, when a user puts the external electronic device 130 in the determined position, the detection of the detection unit 110 may detect that the external electronic device 130 is in the determined position. Thus, the detection unit 110 may know that the external electronic device 130 has been moved to the determined position, and further transmit the power enable signal $S_{enable}$ to the computer host 120. The computer host 120 executes the turn on process according to the power enable signal $S_{enable}$. When a user moves the external electronic device 130 out of the determined position, the detection of the detection unit 110 may detect that the external electronic device 130 is not in the determined position. Thus, the detection unit 110 may know whether the external electronic device 130 has been moved out of the determined position, and further transmit the power disable signal $S_{disable}$ to the computer host 120. The computer host 120 executes the turn off process according to the power disable signal $S_{disable}$. In another illustrated embodiment, the computer host 120 may execute a standby process according to the power disable signal $S_{disable}$ depending user requirements.

Figure 2:
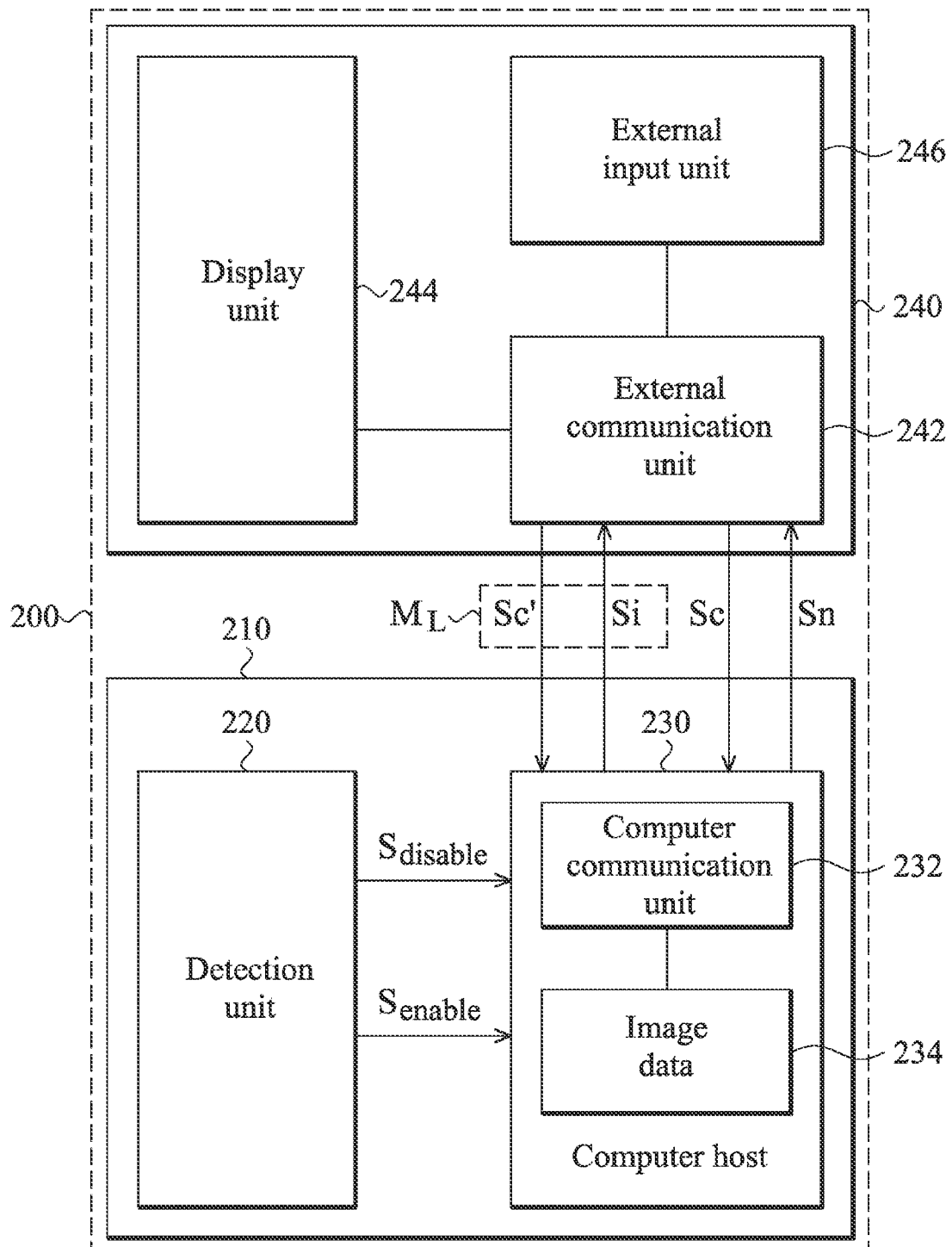
FIG. 2 is a block diagram illustrating an embodiment of a computer integral system 200.

FIG. 2 is a block diagram illustrating an embodiment of a computer integral system 200. The computer integral system 200 comprises a computer integral device 210 and an external electronic device 240, wherein the computer integral device 210 comprises a detection unit 220 and a computer host 230 with a computer communication unit 232 and image data 234. And the external electronic device 240 comprises an external communication unit 242, a display unit 244, and an external input unit 246.

In the illustrated embodiment, when a user places the external electronic device 240 (such as tablet personal computer) in the determined position, the detection unit 220 may know whether the external electronic device 240 has been moved to the determined position and then assert the power enable signal $S_{enable}$ to the computer host 230. After that, the computer host 230 executes the turn on process according to the power enable signal $S_{enable}$. When a user removes the external electronic device 240 from the determined position, the detection unit 220 may know whether the external electronic device 240 has been moved out of the determined position, and further assert the power disable signal $S_{disable}$ to the computer host 230. After that, the computer host 230 executes the turn off process according to the power disable signal $S_{disable}$. In another illustrated embodiment, the computer host 230 may execute a standby process according to the power disable signal $S_{disable}$ depending on system manufacturer' requirements. In the illustrated embodiment, the external electronic device 240 is a tablet personal computer, wherein the tablet personal computer may be any type of tablet personal computer, and the tablet personal computer is not limited to a brand, shape, specification or size. It should be noted, that the tablet personal computer is already turned on in this embodiment. Thus, it may operate as a display monitor after associated wireless communication link with the computer host 230 is established, which will be explained more detailed in the following descriptions.

In some illustrated embodiments, the applications between the computer integral device 210 and the external electronic device 240 can be further integrated. For example, due to the computer host 230 is unaware of which external electronic device triggers the computer turn on process after executing the turn on process, the computer host 230 may broadcast a turn on notice signal Sn to inform the external electronic device 240 via wireless communication. In an illustrated embodiment, the turn on notice signal Sn transmitted from the computer host 230 is received by the external communication unit 242, and is analyzed therein so as to obtain associated information of the computer host 230 by a processor (not shown) of the external electronic device 240. Finally, the display unit 244 displays a message illustrative of the fact that the computer host 230 is available for establishment of a wireless communication link. Thus, after a user selects the computer host 230 for connecting with the external electronic device 240, associated selecting instructions, including associated information of the external electronic device 240, may be transmitted as a control signal Sc to the computer host 230 by the external input unit 246 of the external electronic device 240, and the computer host 230 is notified for establishment of a wireless communication link $W_L$ for operations accordingly (such as accessing the computer host 230). After the wireless communication link $W_L$ between the external electronic device 240 and the computer host 230 is established, the external electronic device 240 may work as a display monitor of the computer host 230. Thus, a user may input instructions on the computer host 230, and the responses of the instructions is transformed into an image signal Si, and then the image signal Si is transmitted to the external communication unit 242 of the external electronic device 240 by the computer communication unit 232. After the image signal Si is processed by the processor of the external electronic device 240, the responses of the instructions can be displayed on the display unit 244 of the external electronic device 240. Accordingly, a user may use the display unit 244 of the external electronic device 240 to display the image data 234 of the computer host 230 without any additional display device coupled with the computer host 230.

It should be noted, a user may input instructions by the external electronic device 240, which may be transformed into an instruction control signal Sc', and then the instruction control signal Sc' is transmitted to the computer communication unit 232 of the computer host 230 by the external input unit 246. The response of the instruction as the image data 234 is transformed into the image signal Si, and transmitted to the external communication unit 242. After the image signal Si is manipulated by the processor of the external electronic device 240, the responses of the instructions can be displayed on the display unit 244 of the external electronic device 240. Those who are skilled in this technology may add this function without departing from the scope and spirit of this invention.

Further, although there is only one computer host 230 in this embodiment of the computer integral system, the external electronic device 240 may also receive turn on notification signals from another computer hosts by means of wireless communications. Thus, a user may decide which one of the computer hosts to link therewith, and he/she may select a proper computer host as his/her requirements. After the wireless communication link $W_L$ between the external electronic device 240 and the computer host 230 is established, the computer communication unit 232 transmits the image signal Si to the external communication unit 242 according to the image data 234, and then the display unit 244 of the external electronic device 240 displays the corresponding image of the image data 234 according to the image signal Si. Thus, a user may use the display unit 244 of the external electronic device 240 to display current image outputs of the computer host 230. Accordingly, it is unnecessary for the computer host 230 to connect to a display device, as the external electronic device 240 (such as a tablet PC) may display the current image outputs.

In some illustrated embodiments, the external electronic device 240 may control other operations of the computer integral device 210. For example, after the computer host 230 executes the turn on process, a user may select the computer host 230 to perform an operation via wireless communication. In the meantime, the wireless communication link $W_L$ between the external communication unit 242 and the computer host 230 has not yet been established, but the external communication unit 242 may transmit a control signal Sc to the computer host 230 according to the selection of a user via wireless communication, and then the computer host 230 is notified by the control signal Sc for establishment of a wireless communication link $W_L$ according to the instruction inputted by a user. After the wireless communication link $W_L$ is established, the display unit 244 works as a display monitor of the computer host 230. Thus, associated image data of the responses of the instructions from the user is displayed by means of the display unit 244 of the external electronic device 240 via the wireless communication link $W_L$. For example, a user may input a disconnect instruction via the external input unit 246, such that the computer host 230 stops transmitting a signal to the external electronic device 240 according to this disconnect instruction. Thus, the wireless communication link between the computer host 230 and the external electronic device 240 would be disconnected. The disconnect instruction illustrated herein is used for the sake of explanations, but the control instruction of the embodiment is not limited thereto. In some of illustrated embodiments, a user may input the instruction via the external input unit 246, or a keyboard or mouse coupled to the computer host 230 or the external electronic device 240. In some of illustrated embodiments, the image signal Si and the instruction control signal Sc' may be transmitted and received via wireless network or blue-tooth communication. After the wireless communication link $W_L$ between the external communication unit 242 and the computer host 230 is established, it may transmit the image signal Si or the instruction control signal Sc' in a real-time manner. However, the capacity of the transmitted data is pretty large. Obviously, it consumes a lot of system resources of the external electronic device 240 and the computer host 230, and thus increases the loads of CPU and memory. In order to improve whole system performances, the computer host 230 may use a multiple-core processor to execute associated operation, such as a Quad-Core processor, and the external electronic device 240 may use a processor with a core faster than 1 GHz.

Figure 3:
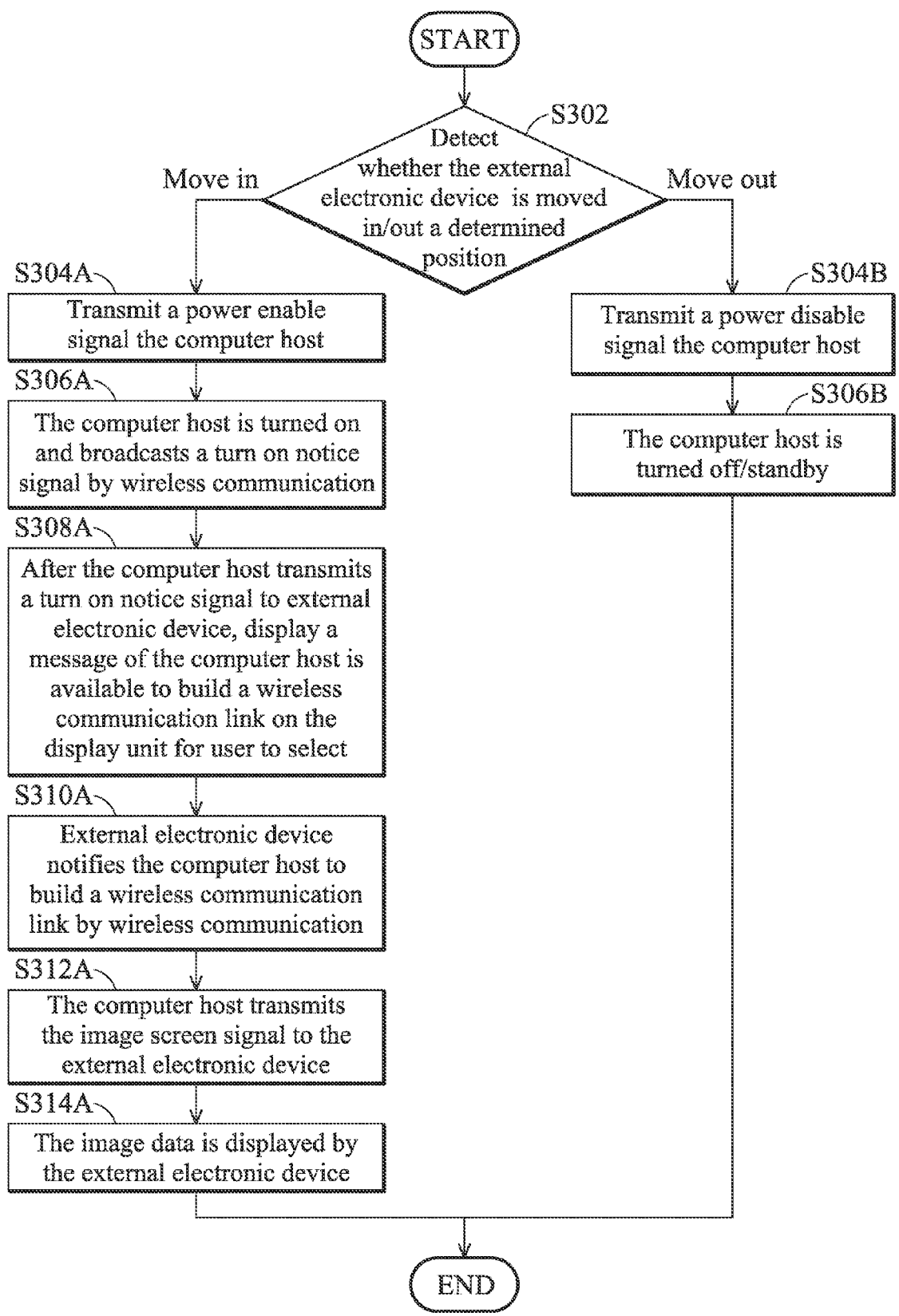
FIG. 3 is a flowchart of an embodiment of a method for the computer integral system 200 shown in FIG. 2.

FIG. 3 is a flowchart of an embodiment of a method for the computer integral system 200 shown in FIG. 2.

In the step S302, whether the external electronic device 240 is in a determined position is detected. When the detection of the detection unit 220 detects that the external electronic device 240 has been placed in the determined position, the detection unit 220 recognizes that the external electronic device 130 has been moved to the determined position and then activate step S304A. Conversely, when the detection of the detection unit 220 detects that the external electronic device 240 has been moved out of the determined position, the detection unit 220 recognizes this situation so as to activate step S304B.

In step S304A, the detection unit 220 transmits the power enable signal $S_{enable}$ to the computer host 230. In step S306A, the computer host 230 executes the turn on process according to the power enable signal $S_{enable}$. Due to the computer host 230 is unaware of which external electronic device triggers the computer turn on process, the computer host 120 may broadcast a turn on notice signal Sn. In step S308A, after the computer host 120 transmits a turn on notice signal Sn to the external communication unit 242 of the external electronic device 240 via a wireless communication link. When the external electronic device 240 receives the turn on notice signal, a message that the computer host 120 is available for establishment of a wireless communication link may display on the display unit 244 waiting for user's selection. In step 310A, a user may select the computer host 230 by means of the external input unit 246 of the external electronic device 240, and then notify the computer host 120 of activating associated operations of establishment of a wireless communication link with the computer host 230. After establishing the wireless communication link $W_L$ with the computer host 230, in the step S312A, the computer host 230 transmits the image signal Si to the external electronic device 240. In step S314A, the display unit 244 of the external electronic device 240 displays corresponding image of the image data 234 according to the image signal Si.

The detection unit 220 transmits the power disable signal $S_{disable}$ to the computer host 230 in step S304B. And then in the step S306B, the computer host 230 executes the computer turn on process or the computer standby process according to the power disable signal $S_{disable}$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer integral device, comprising:
a detection unit configured to detect whether an external electronic device is in a determined position, wherein the external electronic device is turned on; and
a computer host configured to couple to the detection unit, wherein when the external electronic device is detected to be in the determined position by the detection unit, the detection unit sends a power enable signal to the computer host and the computer host executes a computer turn on process according to the power enable signal, wherein the external electronic device selects one from a plurality of turned-on computer hosts which have executed the computer turn on process to establish a wireless communication link and displays image data received via the wireless communication link from the selected turned-on computer host.

2. The computer integral device of claim 1, wherein after the computer turn on process is executed by the computer host, the computer host broadcasts a turn on notification signal to the external electronic device via wireless communication.

3. The computer integral device of claim 2, wherein after the external electronic device receives the turn on notification signal, the external electronic device displays a message on a display unit of the external electronic device indicative of the computer host is available for establishing the wireless communication link.

4. The computer integral device of claim 3, wherein a user uses the external electronic device to establish the wireless communication link by selecting the computer host after the message is displayed on the display unit of the external electronic device.

5. The computer integral device of claim 1, wherein when the wireless communication link is established, the external electronic device works as a display of the computer host, the external electronic device receives the image data via the wireless communication link from the computer host and displays images on a display unit of the external electronic device according to the image data.

6. The computer integral device of claim 1, wherein after the computer turn on process is executed by the computer host, when the external electronic device is detected out of the determined position by the detection unit, the detection unit sends a power disable signal to the computer host, and the computer host executes a computer turn off process or a computer standby process according to the power disable signal.

7. The computer integral device of claim 1, wherein the detection unit is an infrared ray detection unit.

8. The computer integral device of claim 1, wherein the detection unit is a pressure detection unit.

9. A computer integral system, comprising:
an external electronic device, comprising:
an external communication unit configure to receive an image signal; and
a display unit configured to display image data according to the image signal, wherein the external electronic device is turned on; and
a computer integral device, comprising:
a detection unit configured to detect whether the external electronic device is in a determined position; and
a computer host coupled to the detection unit, and having the image data and a computer communication unit,
wherein when the external electronic device is detected to be in the determined position by the detection unit, the detection unit sends a power enable signal to the computer host and the computer host executes a computer turn on process according to the power enable signal, wherein the external electronic device selects one from a plurality of turned-on computer hosts which have executed the computer turn on process to establish a wireless communication link, and the computer communication unit of the selected turned-on computer host generates the image signal according to the image data and transmits the image signal to the external communication unit via the wireless communication link.

10. The computer integral system of claim 9, wherein after the computer turn on process is executed by the computer host, the computer host broadcasts a turn on notification signal to the external electronic device via wireless communication.

11. The computer integral system of claim 10, wherein after the external electronic device receives the turn on notification signal, the external electronic device displays a message on a display unit of the external electronic device, wherein the message shows that the computer host is available for establishing the wireless communication link.

12. The computer integral system of claim 11, wherein a user uses the external electronic device to establish the wireless communication link by selecting the computer host.

13. The computer integral system of claim 9, wherein when the wireless communication link is established, the external electronic device works as a display of the computer host, the external electronic device receives the image data via the wireless communication link from the computer host and displays images according to the image data.

14. The computer integral system of claim 9, further comprising an external input unit, wherein the external input unit instructs the external communication unit to transmit a control signal to the computer communication unit, and the computer host processes a corresponding operation according to the control signal.

15. The computer integral system of claim 9, wherein after the computer turn on process is executed by the computer host, when the external electronic device is detected out of the determined position by the detection unit, the detection unit sends a power disable signal to the computer host, and the computer host executes a computer turn off process or a computer standby process according to the power disable signal.

16. The computer integral system of claim 9, wherein the computer communication unit transmits the image signal to the external communication unit via a wireless communication.

17. The computer integral system of claim 9, wherein the detection unit is an infrared ray detection unit.

18. The computer integral system of claim 9, wherein the detection unit is a pressure detection unit.

19. The computer integral system of claim 9, wherein the external electronic device is a tablet PC, wherein the tablet PC has been turned on.

20. A computer integral method for a computer host and a tablet PC, comprising:

executing a computer turn on process on the computer host when the tablet PC contacts with the computer host, wherein the tablet PC has been turned on;

after the computer turn on process is executed, receiving a turn on notification signal broadcasted from the computer host, wherein the turn on notification signal indicates that the computer host is available for establishing a wireless communication link between the computer host and the tablet PC;

selecting one from a plurality of turned-on computer hosts which have executed the computer turn on process to establish the wireless communication link; and displaying image data transmitted from the selected turned-on computer host on the tablet PC via the wireless communication link after the selecting step.

21. The computer integral method of claim 20, wherein the tablet PC works as a screen of the computer host when the wireless communication link has been established.

22. The computer integral method of claim 20, further comprising:

determining whether the tablet PC is in a determined position before executing the computer turn on process on the computer host.

23. The computer integral method of claim 22, wherein the computer host uses an infrared ray detection unit or a pressure detection unit to detect whether the tablet PC is in the determined position.

\* \* \* \* \*